(12) United States Patent
Cameron

(10) Patent No.: US 9,307,832 B1
(45) Date of Patent: Apr. 12, 2016

(54) FREE STANDING BOAT ACCESSORY TELESCOPIC PEDESTAL DEVICE

(71) Applicant: Larry Cameron, Grant, AL (US)

(72) Inventor: Larry Cameron, Grant, AL (US)

( * ) Notice: Subject to any disclaimer, the term of this patent is extended or adjusted under 35 U.S.C. 154(b) by 0 days.

(21) Appl. No.: 14/728,803

(22) Filed: Jun. 2, 2015

(51) Int. Cl.
*B63B 17/00* (2006.01)
*A47B 9/20* (2006.01)
*A47B 13/02* (2006.01)
*A47B 37/04* (2006.01)

(52) U.S. Cl.
CPC ............... *A47B 9/20* (2013.01); *A47B 13/023* (2013.01); *A47B 37/04* (2013.01); *A47B 2013/024* (2013.01)

(58) Field of Classification Search
USPC ........................................................ 114/363
IPC ........................................... A47B 13/023,37/04
See application file for complete search history.

(56) References Cited

U.S. PATENT DOCUMENTS

| | | | | |
|---|---|---|---|---|
| 4,597,356 A * | 7/1986 | McCaghren et al. | ... | B63B 29/04 114/153 |
| 4,856,452 A * | 8/1989 | Pingel et al. | ............ | B63B 45/04 114/343 |
| 4,928,620 A * | 5/1990 | Currey | .................... | B63B 29/04 114/363 |
| 5,016,225 A | 5/1991 | Blomberg | | |
| 5,746,152 A * | 5/1998 | Huse | ........................ | B63B 29/06 114/363 |
| 5,919,067 A | 7/1999 | Smith | | |
| 7,331,305 B2 * | 2/2008 | Garelick | ................. | B63B 29/04 114/363 |
| 7,677,663 B1 * | 3/2010 | Charles et al. | ........... | B60N 2/14 114/363 |
| 8,430,051 B1 * | 4/2013 | Allison | ................... | B63B 49/00 114/343 |
| 2011/0203496 A1 * | 8/2011 | Garneau et al. | .......... | A47B 9/20 108/147 |
| 2012/0272890 A1 * | 11/2012 | Henke | ........................... | 114/364 |

* cited by examiner

*Primary Examiner* — Stephen Avila
(74) *Attorney, Agent, or Firm* — Crossley & Stevenson IP Law

(57) ABSTRACT

The free standing boat accessory telescopic pedestal device has a trapezoidal reinforced base with a pair of upwardly disposed spaced apart ears. A cylinder is downwardly and pivotally affixed to the ears and has a wing-nutted bolt disposed through the cylinder upwardly within the ears. Removal of the wing-nutted bolt allows the cylinder to pivot from an upward position to a position coplanar with the base. A larger tube is affixed upwardly to the cylinder. A smaller tube is slidably and rotatably disposed within the larger tube and is positioned therein via a twist lock. A platform is perpendicularly affixed atop the smaller tube and accepts accessories such as a GPS, a depth finder, a camera, a telescope, and the like.

8 Claims, 3 Drawing Sheets

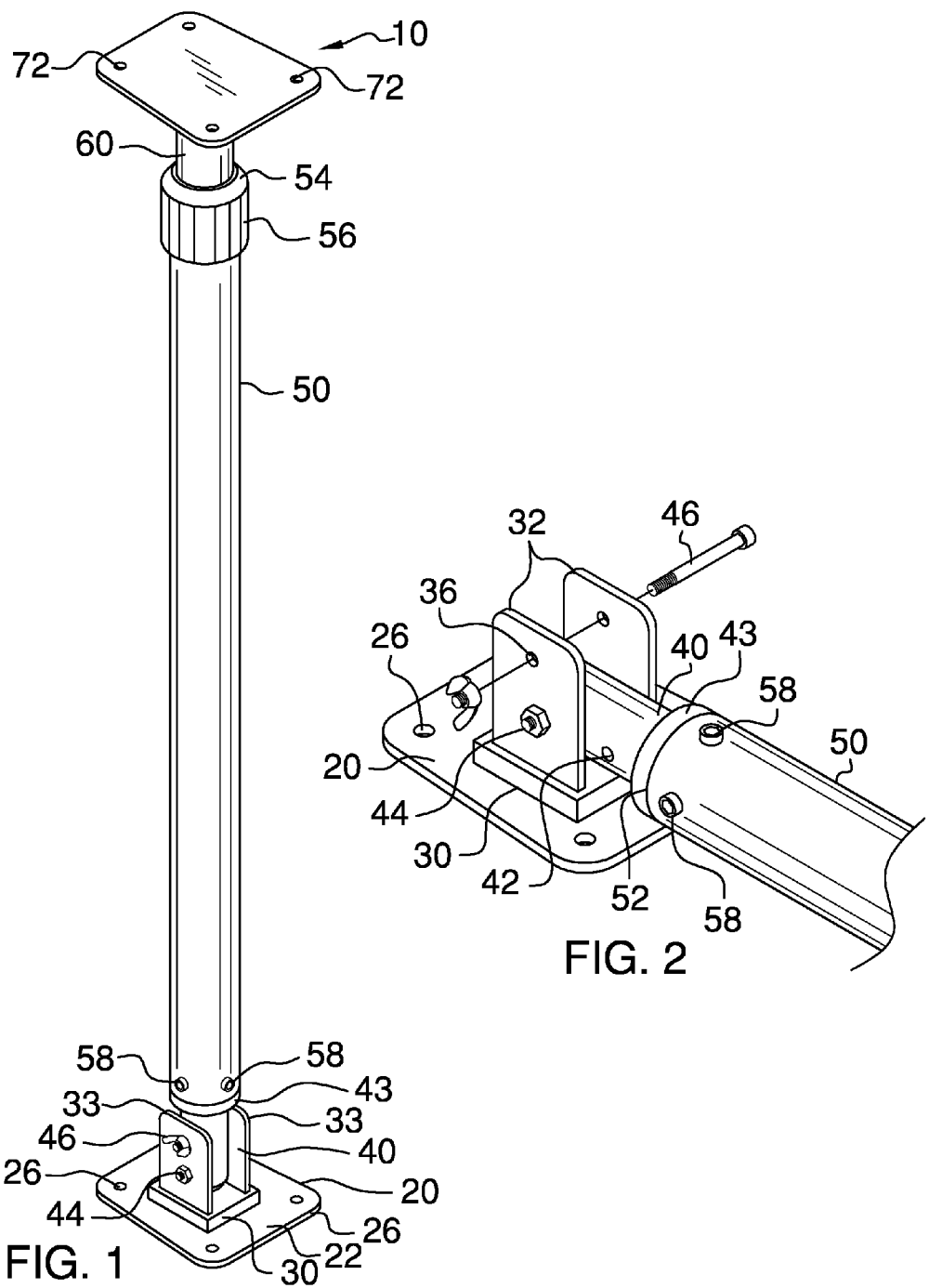

FREE STANDING BOAT ACCESSORY TELESCOPIC PEDESTAL DEVICE

BACKGROUND OF THE INVENTION

Of the various types of boat accessory attachment devices known in the prior art none provide a free standing telescopic pedestal device for a boat that has a reinforced pivotal base that attaches to a boat surface providing a pivot and further telescopes and rotates to a chosen height via a twist clamp for convenience for a user.

FIELD OF THE INVENTION

The present free standing boat accessory telescopic pedestal device relates to boat accessories and more especially to a free standing boat accessory telescopic pedestal device.

SUMMARY OF THE INVENTION

The general purpose of the free standing boat accessory telescopic pedestal device, described subsequently in greater detail, is to provide a free standing boat accessory telescopic pedestal device that has many novel features that result in a free standing boat accessory telescopic pedestal device which is not anticipated, rendered obvious, suggested, or even implied by prior art, either alone or in combination thereof.

To accomplish this, the free standing boat accessory telescopic pedestal device comprises has a trapezoidal base having a top side and a bottom side spaced apart from the top side. A reinforcement plate is disposed atop the top side. A plurality of apertures is disposed through the trapezoidal base. The trapezoidal base is superior to a rectangular base in that holes are not completely aligned in two directions, a design that weakens some mounting surfaces, especially those with a grain such as wood for example. A pair of spaced apart ears is perpendicularly disposed atop the reinforcement plate. Each ear of the pair of ears has rounded corners disposed upwardly. A first hole is disposed through the pair of ears proximal the reinforcement plate. A second hole is disposed through the pair of ears above the first hole. The second hole is distal the reinforcement plate.

A cylinder is pivotally disposed between the pair of ears. The cylinder has a first orifice and a second orifice spaced apart from the first orifice. The first and second orifices, are selectively aligned with the first hole and the second hole, respectively. An annulus is disposed around an approximate midpoint of the cylinder. A nutted bolt is selectively disposed through first hole and the first orifice. A wing-nutted bolt is selectively disposed through the second hole and the second orifice. The wing-nutted bolt provides a handy removable feature that assist in use of the device. A removal of the wing-nutted bolt is configured to allow a pivot of the cylinder around the nutted bolt. The rounded corners are configured to provide a clearance for the annulus to pivot.

A larger tube has a proximal end and a distal end spaced apart from the proximal end. The proximal end is disposed around the cylinder above the annulus. A twist lock is disposed on the distal end. A plurality of fasteners affixes the proximal end to the cylinder. A smaller tube has a first end and a second end spaced apart from the first end. The first end is slidably disposed within the distal end. The smaller tube is slidably and rotatably disposed within the larger tube. The smaller tube is slidably removable from the larger tube. A platform is disposed perpendicularly atop the second end. A plurality of foramen is disposed within the platform wherein the platform is configured to selectively hold a plurality of accessories. The accessories include but are not limited to a GPS, a depth finder, a camera, a telescope, and the like.

The pivot provides for the larger and smaller tubes to be disposed in a position adjacent a deck or the like of the boat, wherein debris, bridges, and other obstacles are avoided by the device and by accessories attached to the device. The ability of the smaller pole to telescope within the larger pole provides for mounting the plurality of accessories to be selectively positioned at a desired height.

Thus has been broadly outlined the more important features of the present free standing boat accessory telescopic pedestal device so that the detailed description thereof that follows may be better understood and in order that the present contribution to the art may be better appreciated.

BRIEF DESCRIPTION OF THE DRAWINGS

Figures

FIG. 1 is a perspective view.
FIG. 2 is a partial perspective view highlighting a base and cylinder.

DETAILED DESCRIPTION OF THE DRAWINGS

Figure 3:
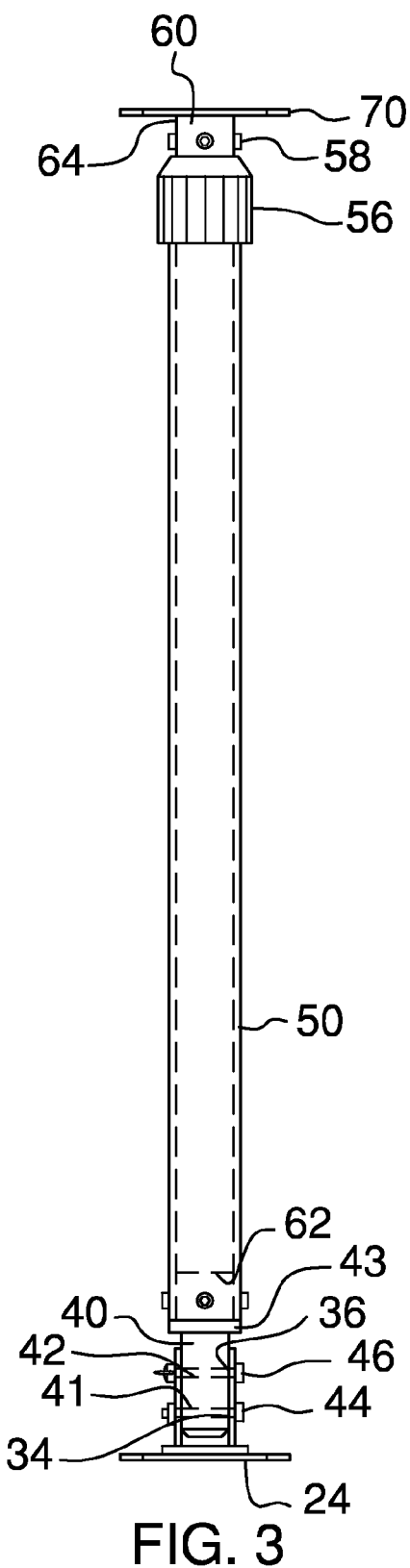
FIG. 3 is a frontal elevation view.
Figure 4:
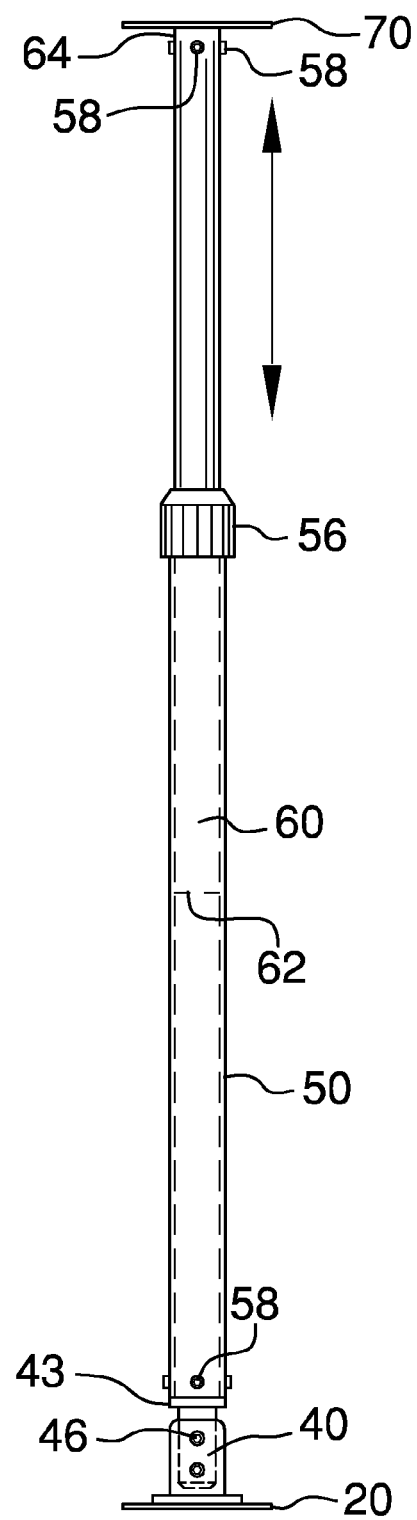
FIG. 4 is a lateral elevation view.
Figure 5:
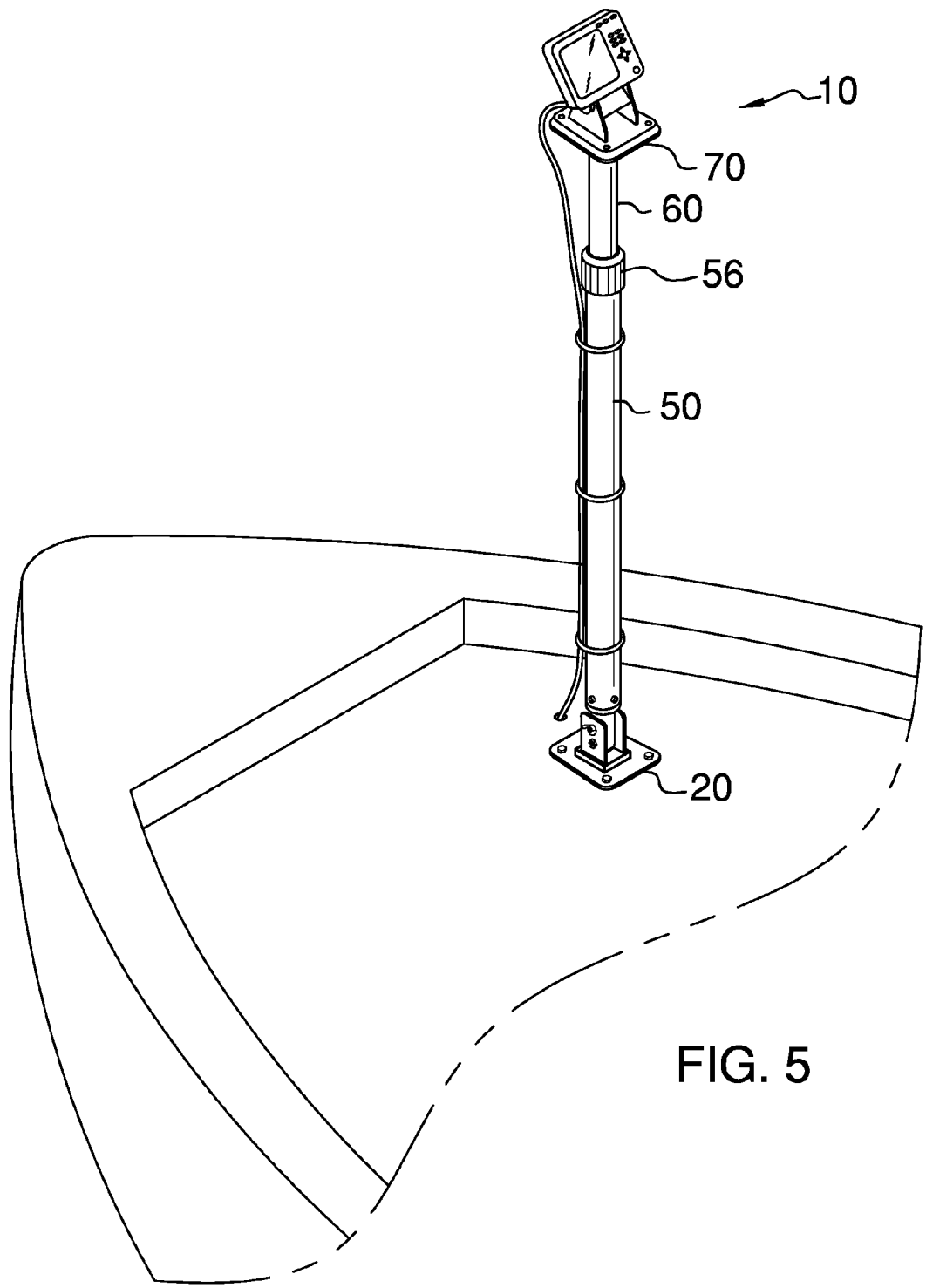
FIG. 5 is an in use view.

With reference now to the drawings, and in particular FIGS. 1 through 5 thereof, an example of the free standing boat accessory telescopic pedestal device employing the principles and concepts of the present free standing boat accessory telescopic pedestal device and generally designated by the reference number 10 will be described.

Referring to FIGS. 1 through 5, the free standing boat accessory telescopic pedestal device 10 has a trapezoidal base 20 having a top side 22 and a bottom side 24 spaced apart from the top side 22. A reinforcement plate 30 is disposed atop the top side 22. A plurality of apertures 26 is disposed through the trapezoidal base 20. A pair of spaced apart ears 32 is perpendicularly disposed atop the reinforcement plate 30. Each ear 32 of the pair of ears 32 has rounded corners 33 disposed upwardly. A first hole 34 is disposed through the pair of ears 32 proximal the reinforcement plate 30. A second hole 36 is disposed through the pair of ears 32 above the first hole 34. The second hole 36 is distal the reinforcement plate 30.

A cylinder 40 is pivotally disposed between the pair of ears 32. The cylinder 40 has a first orifice 41 and a second orifice 42 spaced apart from the first orifice 41. The first and second orifices 41, 42 are selectively aligned with the first hole 34 and the second hole 36, respectively. An annulus 43 is disposed around an approximate midpoint of the cylinder 40. A nutted bolt 44 is selectively disposed through first hole 34 and the first orifice 41. A wing-nutted bolt 46 is selectively disposed through the second hole 36 and the second orifice 42. A removal of the wing-nutted bolt 46 is configured to allow a pivot of the cylinder 40 around the nutted bolt 44. The rounded corners 33 are configured to provide a clearance for the annulus 43 to pivot.

A larger tube 50 has a proximal end 52 and a distal end 54 spaced apart from the proximal end 52. The proximal end 52 is disposed around the cylinder 40 above the annulus 43. A twist lock 56 is disposed on the distal end 54. A plurality of fasteners 58 affixes the proximal end 52 to the cylinder 40. A smaller tube 60 has a first end 62 and a second end 64 spaced apart from the first end 62. The first end 62 and substantially all of the smaller tube 60 is slidably and rotatably disposed within the larger tube 50. The smaller tube 60 is slidably removable from the larger tube 50. A platform 70 is disposed perpendicularly atop the second end 64. A plurality of foramen 72 is disposed within the platform 70 wherein the platform 70 is configured to selectively hold a plurality of existing accessories. The accessories include but are not limited to a GPS, a depth finder, a camera, a telescope, and the like.

The invention claimed is:

1. A free standing boat accessory telescopic pedestal device comprising:
   a trapezoidal base having a top side and a bottom side spaced apart from the top side;
   a plurality of apertures disposed through the trapezoidal base;
   a pair of spaced apart ears perpendicularly disposed atop the trapezoidal base, each ear of the pair of ears having rounded corners disposed upwardly;
   a first hole disposed through the pair of ears proximal the base;
   a second hole disposed through the pair of ears above the first hole, the second hole distal the base;
   a cylinder pivotally disposed between the pair of ears, the cylinder having a first orifice and a second orifice spaced apart from the first orifice, the first and second orifice selectively aligned with the first hole and the second hole, respectively;
   an annulus disposed around an approximate midpoint of the cylinder;
   a nutted bolt selectively disposed through first hole and the first orifice;
   a wing-nutted bolt selectively disposed through the second hole and the second orifice;
   wherein a removal of the wing-nutted bolt is configured to allow a pivot of the cylinder around the nutted bolt;
   wherein the rounded corners are configured to provide a clearance for the annulus;
   a larger tube having a proximal end and a distal end spaced apart from the proximal end, the proximal end disposed around the cylinder above the annulus;
   a twist lock disposed on the distal end;
   a plurality of fasteners affixing the proximal end to the cylinder;
   a smaller tube having a first end and a second end spaced apart from the first end, the smaller tube slidably and rotatably disposed within the larger tube;
   wherein the smaller tube is slidably disposed within the larger tube;
   a platform disposed perpendicularly atop the second end; and
   a plurality of foramen disposed within the platform;
   wherein the platform is configured to selectively hold a plurality of accessories.

2. The free standing boat accessory telescopic pedestal device of claim 1 composed of corrosive resistant materials.

3. The free standing boat accessory telescopic pedestal device of claim 1 wherein the cylinder is hollow.

4. The free standing boat accessory telescopic pedestal device of claim 2 wherein the cylinder is hollow.

5. A free standing boat accessory telescopic pedestal device comprising:
   a trapezoidal base having a top side and a bottom side spaced apart from the top side;
   a reinforcement plate disposed atop the top side;
   a plurality of apertures disposed through the trapezoidal base;
   a pair of spaced apart ears perpendicularly disposed atop the reinforcement plate, each ear of the pair of ears having rounded corners disposed upwardly;
   a first hole disposed through the pair of ears proximal the reinforcement plate;
   a second hole disposed through the pair of ears above the first hole, the second hole distal the reinforcement plate;
   a cylinder pivotally disposed between the pair of ears, the cylinder having a first orifice and a second orifice spaced apart from the first orifice, the first and second orifice selectively aligned with the first hole and the second hole, respectively;
   an annulus disposed around an approximate midpoint of the cylinder;
   a nutted bolt selectively disposed through first hole and the first orifice;
   a wing-nutted bolt selectively disposed through the second hole and the second orifice;
   wherein a removal of the wing-nutted bolt is configured to allow a pivot of the cylinder around the nutted bolt;
   wherein the rounded corners are configured to provide a clearance for the annulus;
   a larger tube having a proximal end and a distal end spaced apart from the proximal end, the proximal end disposed around the cylinder above the annulus;
   a twist lock disposed on the distal end;
   a plurality of fasteners affixing the proximal end to the cylinder;
   a smaller tube having a first end and a second end spaced apart from the first end, the smaller tube slidably and rotatably disposed within the larger tube;
   wherein the smaller tube is slidably disposed within the larger tube;
   a platform disposed perpendicularly atop the second end; and
   a plurality of foramen disposed within the platform;
   wherein the platform is configured to selectively hold a plurality of accessories.

6. The free standing boat accessory telescopic pedestal device of claim 5 composed of corrosive resistant materials.

7. The free standing boat accessory telescopic pedestal device of claim 5 wherein the cylinder is hollow.

8. The free standing boat accessory telescopic pedestal device of claim 6 wherein the cylinder is hollow.

* * * * *